(12) United States Patent
Leutwyler et al.

(10) Patent No.: US 7,699,534 B2
(45) Date of Patent: Apr. 20, 2010

(54) PLASTIC FERRULE

(75) Inventors: Werner Leutwyler, Zurich (CH);
Giorgio Friedrich, Hettlingen (CH);
Oliver Eckstein, Hinwil (CH); Rolf Weber, Freienstein-Teusen (CH)

(73) Assignee: Reichle & De-Massari AG, Wetzikon (CH)

( * ) Notice: Subject to any disclaimer, the term of this patent is extended or adjusted under 35 U.S.C. 154(b) by 383 days.

(21) Appl. No.: 11/578,030

(22) PCT Filed: Apr. 21, 2005

(86) PCT No.: PCT/CH2005/000224

§ 371 (c)(1),
(2), (4) Date: Oct. 12, 2006

(87) PCT Pub. No.: WO2005/103785

PCT Pub. Date: Nov. 3, 2005

(65) Prior Publication Data

US 2008/0273841 A1    Nov. 6, 2008

(30) Foreign Application Priority Data

Apr. 22, 2004   (CH) .................................. 0706/04

(51) Int. Cl.
*G02B 6/36* (2006.01)

(52) U.S. Cl. ................. 385/78; 385/53; 385/76; 385/77

(58) Field of Classification Search .............. 385/53, 385/76, 77, 78
See application file for complete search history.

(56) References Cited

U.S. PATENT DOCUMENTS 5,252,494 A * 10/1993 Walt .......................... 436/528
6,804,439 B1 * 10/2004 Pregitzer .................... 385/100
6,877,910 B2 * 4/2005 Takahashi et al. ............ 385/84

* cited by examiner

*Primary Examiner*—Jennifer Doan
(74) *Attorney, Agent, or Firm*—The Nath Law Group; Jerald L. Meyer; Stanley N. Protigal

(57) ABSTRACT

A plastic ferrule (1) for optical connecting systems, in which a optical wave guide (3) of an optical fibre (6) is guided through a support element (2), whereby the optical wave guide (3) is surface-conditioned in a partial area (4) in order to bond in a force-actuated way to a hardened casting mass (5) in this partial area (4).

13 Claims, 1 Drawing Sheet

PLASTIC FERRULE

Figure 1:
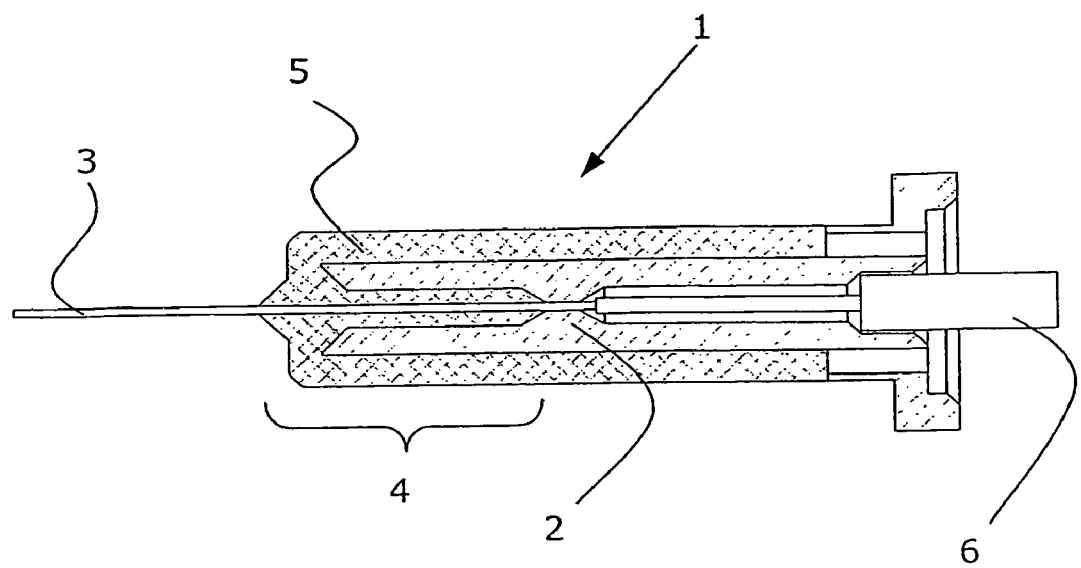

The present invention relates to a plastic ferrule for optical connection systems in which ferrule an optical wave guide is fixed, free of adhesive.

Nowadays modern data transmission systems increasingly make use of optical systems with fibre optics. Within these systems the coupling points must have a high level of geometric precision and thermal stability and the aim is to ensure this using so-called ferrules. These ferrules are installed/integrated in optical connection systems and serve in particular for the radial centring and axial positioning and mounting of the fibre optics. Configurations (e.g. geometry and smoothness of the face surface) and physical parameters (e.g. contact pressure in the range of elastic deformation) in relation to the optical coupling of fibre optics for message transfer are standardised by standards such as IEC 61754-x or IEC 61755-x.

Traditionally, a hard metal or a suitable metal alloy is used for manufacturing ferrules of this type, for example as described in US2003/0002817. Processing such materials requires a series of complex mechanical and expensive manual production steps.

However, the manufacture of such ferrules from a ceramic material is also known. Thus U.S. Pat. No. 6,358,874 discloses the use of a ceramic material containing zirconium with extraordinary hardness and abrasion resistance. Although the low friction force of this material makes it easy to insert the fibre optic into the ferrule it also requires an adhesive process to fix the fibre optic in the ferrule.

A ferrule is described in U.S. Pat. No. 6,533,469, which has a ceramic tip and a plastic ferrule body, in which the fibre optic is again fixed using a suitable adhesive. In addition, ceramic material has physical properties that make processing undesirably difficult and expensive.

For example, in order to connect the ferrule and fibre optic to each other in a simple and secure way, EP 1 180 248 suggests fixing the plastic fibre optic to optically transparent ferrules using laser welding. Unfortunately, this method has not proven itself, especially since longer-term appearances of diffusion have a negative effect on the transmission characteristics of the fibre optic.

Therefore the object of the present invention is to produce a ferrule that does not have the disadvantages of the named ferrules and, in particular, one that allows simple manufacture and ensures unlimited functionality over the longer term.

According to the invention, this object is achieved by a plastic ferrule in which an optical wave guide is fixed, free of adhesive. The optical wave guide is surface-conditioned in at least a partial area, i.e. provided with a bonding agent, in such a way that the optical wave guide adheres in a force-actuated way to a hardened casting mass at least in this partial area. In particular, the bonding may be achieved by the use of a casting compound, so that the casting compound, when cast, bonds to at least a partial area of the fibre optic that has been surface-conditioned.

The conditioning of surfaces for creating a force-actuated adherence is well known to the person skilled in the art, for example from the manual "Materials, fillers and facing plastics," especially from the chapter by Björn Richter in the Material Sciences Document of the Dentistry Technical Group of the University of Marburg concerning bonding agents and silanization. At this point, reference can also be made to the publication by Walter G. McDonough et al. "Interfacial shear strengths of dental resin-glass fibres by the microbond test", National Institute of Standards and Technology, Polymer Division, Gaithersburg, Md. 20899, USA, online available since Sep. 19, 2001. A general introduction to the techniques for modification of surfaces can be found in the Dissertation of the Faculty for Chemistry and Pharmacy of Eberhard-Karls University, Tübingen entitled "Modification of surfaces for thermodynamic and kinetic characterisation of biomolecular recognition with optical transducers" by Jacob Piehler, 1997. These bonding agents generally form an extremely thin, molecular coating of less than 0.1 µm.

Materials that can be cold cast are preferably used as casting compound for the ferrules according to the invention and no materials should be used that have to be injected with the use of heat and pressure, like e.g. self-reinforcing partially crystalline polymers, especially LCP (Liquid Crystal Polymer). The aim is to use the type of materials used in dental technology for manufacturing replacement teeth, tooth fillings or restorative fixtures. Materials that are particularly suitable are those that can be cast which are based on plastic casting resin or based on acrylate, preferably methacrylate or methyl methacrylate (suitable monomers, stabilizers, inhibitors and filling materials are sufficiently known to the person skilled in the art and are not objects of the present invention). Polymerizing materials that can be hardened using light are preferably used for the present invention. It is understood that materials that can be cast can also be used which are hardened or set with activation by ultrasound or other forms of energy, in particular without the supply of heat. Light-polymerizing plastics and plastics that can be modelled are known in the area of industrial plastics, which can be hardened completely after their application using a wide range of initiators. Additives to optimise the required physical properties are sufficiently known to the person skilled in the art in this area and can be added as required. In addition, abrasion-resistant compomers can also be used. Compomers of this type are used more and more frequently in conservation dental practice in addition to modern composite materials and are sufficiently known to the person skilled in the art. These compomers are distinguished from the classic composites by the acid-base reaction of the corresponding monomer and filling agent components that takes place in addition to the polymerization. Compomers based on vinyl-phosphonic acid have particularly proven themselves as abrasion-resistant materials.

In particular it is understood that hardening additives can be added to the casting mass and the casting mass is selected in such a way that this cannot change the refraction index of the core of the fibre, i.e. the optical wave guide in the long term. In this case, the surface conditioning, i.e. the application of a bonding agent and especially silanizing, provides significant protection against the appearances of diffusion between the casting mass and the optical wave guide.

For manufacturing an embodiment of the ferrule according to the invention, the casting mass used comes from the family of filling materials or plastic restorative fixing materials known in dental science. These materials based on polymer can be cast in a simple way and do not have to be hardened under pressure. These materials correspond to the criteria of the international standard ISO 4049. A casting mass from this family which is suitable for the ferrule according to the invention has the following properties:

Poisson ratio: $\nu=0.3$-$0.035$

Modulus of elasticity: $\eta=70$-$200$ GPa, preferably $\eta>150$ GPa,

Hardness: $HV=350$-$450$ N/mm$^2$, preferably 6.5 Mohs

Compression strength: $\sigma=200$-$300$ N/mm$^2$,

Water solubility: $L<1$ µg/mm$^3$,

Water absorption: $A<25$ µg/mm$^3$, and in particular:

Specific heat: $C_p=500$ J/kg K,

Heat conductivity: $\lambda>3$ W/mK,

Linear expansion coefficient: $\alpha<8 \times 10^{-6}$/K,

Graining: $\kappa<0.1$ µm,

A preferred casting mass based on resin has the following properties:

Bending strength: $\sigma=120$ N/mm$^2$.
Bending modulus: B=6000 N/mm$^2$,
Water absorption: A=22.0 µg/mm$^3$,
Water solubility: L<1.0 µg/mm$^3$,
X-ray opacity: O=160% Al
Through-hardening depth: h>6 mm
Compression strength: $\sigma=270$ N/mm$^2$,
Transparency: T=15-23% (depending on opacity)

The above-mentioned materials can absorb pressure and shear forces of up to 100 kN, they are acid resistant and temperature resistant. The dimensional stability and longevity are ensured by their water absorption resistance.

The values given for the specific heat, the heat conductivity and the linear expansion coefficients prove to be significant in connection with the high power density of several 100 kW/cm$^2$ to be transmitted by the optical wave guides. The values for the graining, the modulus of elasticity and the Poisson ratio are necessary to ensure that the contact of the fibre optic face surface that is under the specified contact pressure is mechanically stable and intact.

Figure 2:
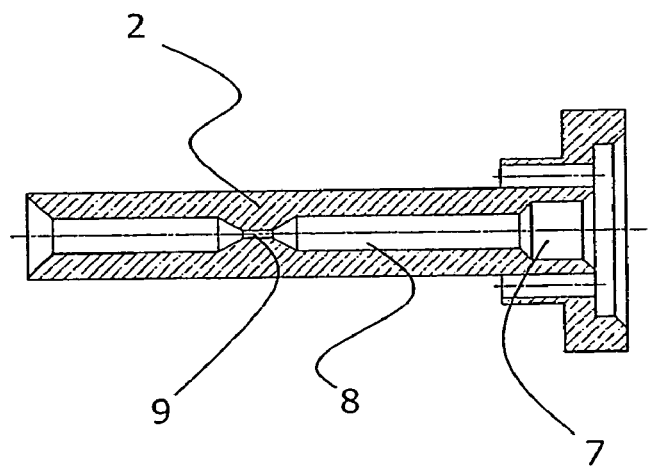

In the following section, the invention will be explained with the aid of the figures. These show:

FIG. 1: Schematic longitudinal section through a ferrule according to the invention;

FIG. 2: Schematic longitudinal section through a support element.

The structure of a preferred embodiment of a ferrule 1 according to the invention can be seen from FIG. 1. In this case, a support element 2 allows an initial positioning of the optical wave guide 3, which is surface-conditioned in at least a partial area 4, i.e. provided with a bonding agent. This conditioning leads to a force-actuated adherence of the optical wave guide 3 to a casting compound 5 surrounding this optical wave guide 3 and the support element 2. In the surface-conditioned partial area 4, the bonding agent has a coating thickness of less than 1 µm and in particular forms a monolayer coating. In a preferred embodiment, the surface-conditioned partial area 4 of the optical wave guide 3 is silanized.

FIG. 2 shows the geometric design of a support element 2 for the preferred embodiment of a plastic ferrule 1 according to the invention. In this case, the interior of this support element 2 can be divided in different areas, a first area 7 in which the fibres 6 to be fixed come to rest. A second area 8 is suitable in order to hold the fibre 6 freed from the coating, while in a third area 9, the optical wave guide 3 that is freed of the cladding is guided. This support element 2, together with the surface-conditioned optical wave guide 3 is tensioned in a casting tool in such a way that the optical wave guide 3 is centred and a casting mass 5 can be cast around the centred optical wave guide 3 and the precisely positioned support element 2. In this case, the casting mass 5 forms a stable adhesive bond with the surface-conditioned partial area of the optical wave guide 3.

The advantages of the invention are immediately apparent to the person skilled in the art. In particular, the amount of work involved in manufacturing a ferrule is considerably reduced by using this type of ferrule structure. In addition, ferrules can be manufactured that have manufacturing tolerances in the µm range or below and whose optical wave guides are centred within these manufacturing tolerances. The raw material can be processed in a simple way, i.e. can be cold cast, for example. The hardened materials are chemically stable, i.e. they do not give off any substances (sublimation, outgassing), nor do they absorb foreign substances from the atmosphere (moisture). The ferrules manufactured in the conventional way generally require complicated reworking processes, which can be dispensed with if casting masses according to the invention are used. The surface treatment of the optical wave guide proves to be significant to the invention; if the above-mentioned casting masses are used, this treatment requires no additional adhesives to fix the optical wave guide in the ferrule.

The simplification in the manufacturing according to the invention of ferrules provided with optical wave guides with the use of a bonding agent is obvious to the person skilled in the art. In this case, the long-term unrestricted functionality of a optical wave guide fixed according to the invention is ensured as a result of the bonding agent, in particular as this effectively prevents any protection against diffusion of the ferrule plastic into the optical wave guide. It is understood that the casting mass used can also be used for only one partial area of the ferrule.

The invention claimed is:

1. Plastic ferrule for optical connecting systems, in which ferrule an optical wave guide is fixed, characterized in that the optical wave guide is surface-conditioned in at least a partial area by providing the partial area with a bonding agent, in such a way that the optical wave guide adheres in a force-actuated way to a hardened casting mass at least in this partial area, whereby the optical waveguide requires no additional adhesives to fix the optical waveguide in the ferrule.

2. Plastic ferrule according to claim 1, characterized in that the bonding agent in the surface-conditioned partial area has a layer thickness of less than 100 nm.

3. Plastic ferrule according to claim 1, characterized in that the surface-conditioned partial area is silanized.

4. Plastic ferrule according to claim 1, characterized in that it has a support element that is cast with the casting mass.

5. Plastic ferrule according to claim 1, characterized in that the casting mass is a cold hardening casting mass.

6. Plastic ferrule according to claim 1, characterized in that the casting mass is a casting mass that polymerizes by the action of light.

7. Plastic ferrule according to claim 1, characterized in that the casting mass is a plastic based on acrylate, especially on methacrylate.

8. Plastic ferrule according to claim 1, characterized in that the casting mass is a plastic based on methyl methacrylate.

9. Plastic ferrule according to claim 1, characterized in that the casting mass is a casting resin that can be hardened, in particular based on epoxy resin.

10. Plastic ferrule according to claim 1, characterized in that the casting mass is a composite material based on a compomer.

11. A silanizing method for fixing an optical wave guide in a ferrule, the method comprising:
providing a plastic ferrule suitable for fixing the optical wave guide; and
surface-conditioning the optical wave guide in at least a partial area by providing the optical wave guide with a bonding agent, in such a way that the optical wave guide adheres in a force-actuated way to a hardened casting mass at least in this partial area, whereby the optical waveguide requires no additional adhesives to fix the optical waveguide in the ferrule.

12. Plastic ferrule according to claim 1, characterized in that the bonding agent in the surface-conditioned partial area has a layer thickness of less than 10 nm.

13. Plastic ferrule according to claim 1, characterized in that the bonding agent in the surface-conditioned partial area has a layer thickness of less than 1 nm.

* * * * *